United States Patent
Oura et al.

(10) Patent No.: US 11,479,125 B2
(45) Date of Patent: Oct. 25, 2022

(54) FUEL CELL VEHICLE

(71) Applicant: TOYOTA JIDOSHA KABUSHIKI KAISHA, Toyota (JP)

(72) Inventors: Junichi Oura, Okazaki (JP); Ryouichi Namba, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 370 days.

(21) Appl. No.: 16/815,222

(22) Filed: Mar. 11, 2020

(65) Prior Publication Data

US 2020/0317061 A1    Oct. 8, 2020

(30) Foreign Application Priority Data

Apr. 3, 2019 (JP) .............................. JP2019-071136

(51) Int. Cl.
*B60L 11/18* (2006.01)
*B60L 7/18* (2006.01)
(Continued)

(52) U.S. Cl.
CPC .................................... *B60L 7/26* (2013.01); *B60L 7/10* (2013.01); *B60L 15/2009* (2013.01);
(Continued)

(58) Field of Classification Search
CPC .. Y02E 60/50; Y02E 60/10; H01M 2250/402; H01M 8/04492; H01M 8/04179; H01M 8/04111; H01M 8/04843; H01M 2220/20; H01M 16/006; H01M 2250/20; H01M 8/04201; H01M 8/04089;
(Continued)

(56) References Cited

U.S. PATENT DOCUMENTS

| 2004/0159480 A1 | 8/2004 | Ishikawa et al. |
| 2009/0142633 A1 | 6/2009 | Kizaki |

(Continued)

FOREIGN PATENT DOCUMENTS

| JP | 2003308866 A | 10/2003 |
| JP | 2004119052 A | 4/2004 |

(Continued)

OTHER PUBLICATIONS

U.S. Appl. No. 16/844,498, filed Apr. 9, 2020.
(Continued)

*Primary Examiner* — Jared Fureman
*Assistant Examiner* — Esayas G Yeshaw
(74) *Attorney, Agent, or Firm* — Dickinson Wright, PLLC

(57) ABSTRACT

A braking control unit of a fuel cell vehicle is configured to, in a period during which the fuel cell vehicle is being braked in response to a braking request, (i) when an estimated amount of stagnant water is less than a predetermined second water amount less than a first water amount, limit an upper limit electric power of a regenerated electric power resulting from regenerative operation to a predetermined first value or below, and (ii) when the estimated amount of stagnant water is greater than or equal to the second water amount, execute an upper limit changing process of setting an upper limit electric power to a second value lower by a predetermined value than the first value.

5 Claims, 7 Drawing Sheets

(51) Int. Cl.
    *B60L 7/26*     (2006.01)
    *B60L 50/75*     (2019.01)
    *B60L 7/10*     (2006.01)
    *B60L 15/20*     (2006.01)
    *B60L 58/40*     (2019.01)
    *H01M 16/00*     (2006.01)
    *H01M 8/04828*     (2016.01)
    *H01M 8/04492*     (2016.01)
    *H01M 8/04111*     (2016.01)
    *H01M 8/04119*     (2016.01)

(52) U.S. Cl.
    CPC ............... *B60L 50/75* (2019.02); *B60L 58/40* (2019.02); *H01M 8/04111* (2013.01); *H01M 8/04179* (2013.01); *H01M 8/04492* (2013.01); *H01M 8/04843* (2013.01); *H01M 16/006* (2013.01); *H01M 2220/20* (2013.01); *H01M 2250/20* (2013.01)

(58) Field of Classification Search
    CPC ...... B60L 58/40; B60L 15/2009; B60L 50/75; B60L 7/26; B60L 7/10; Y02T 10/64; Y02T 90/40; Y02T 10/70; Y02T 10/72; Y02B 90/10
    See application file for complete search history.

(56) References Cited

U.S. PATENT DOCUMENTS

| | | | |
|---|---|---|---|
| 2010/0190071 A1* | 7/2010 | Kaito | H01M 8/04291 |
| | | | 429/429 |
| 2011/0049969 A1 | 3/2011 | Park | |
| 2012/0056470 A1 | 3/2012 | Kim | |
| 2013/0218435 A1 | 8/2013 | Nakamura | |
| 2014/0080018 A1* | 3/2014 | Ohgami | H01M 8/04097 |
| | | | 429/444 |
| 2016/0137068 A1 | 5/2016 | Nada et al. | |
| 2016/0137077 A1 | 5/2016 | Kim et al. | |
| 2016/0141655 A1 | 5/2016 | Naganuma et al. | |
| 2016/0141905 A1 | 5/2016 | Yamanaka et al. | |
| 2016/0372768 A1* | 12/2016 | Procter | H01M 8/04529 |
| 2017/0309935 A1* | 10/2017 | Lee | H01M 8/04947 |
| 2018/0126862 A1 | 5/2018 | Huh et al. | |
| 2020/0331353 A1 | 10/2020 | Nanba | |

FOREIGN PATENT DOCUMENTS

| | | |
|---|---|---|
| JP | 2004152598 A | 5/2004 |
| JP | 2006020468 A | 1/2006 |
| JP | 2006034034 A | 2/2006 |
| JP | 2006034036 A | 2/2006 |
| JP | 2007066680 A | 3/2007 |
| JP | 2013233051 A | 11/2013 |
| JP | 2015164092 A | 9/2015 |
| JP | 2016096058 A | 5/2016 |
| JP | 2017157270 A | 9/2017 |

OTHER PUBLICATIONS

Office Action issued to U.S. Appl. No. 16/844,498 dated Jan. 13, 2022.

Ryouchi Nanba, Corrected Notice of Allowability issued to U.S. Appl. No. 16/844,498 dated Aug. 16, 2022.

\* cited by examiner

FUEL CELL VEHICLE

INCORPORATION BY REFERENCE

The disclosure of Japanese Patent Application No. 2019-071136 filed on Apr. 3, 2019 including the specification, drawings and abstract is incorporated herein by reference in its entirety.

BACKGROUND

1. Technical Field

The disclosure relates to a technology for fuel cell vehicles.

2. Description of Related Art

Hitherto, a fuel cell vehicle including a fuel cell and a regenerative drive motor is known (Japanese Unexamined Patent Application Publication No. 2017-157270 (JP 2017-157270 A)). With the existing technology, when not all the electric power generated by the drive motor can be charged into a secondary battery and there is a dump electric power difference obtained by subtracting an electric power distributed to auxiliaries from a dump electric power that cannot be charged into the secondary battery, control for decreasing the efficiency of regenerative control or the driving efficiency of the auxiliaries is executed.

SUMMARY

In a fuel cell vehicle, an electric power to be generated includes an electric power resulting from regenerative control over the drive motor and an electric power resulting from power generation of a fuel cell (generated electric power). Generated electric power can be developed by unexpected power generation not caused by user's operation, for example, power generation caused by scavenging process. When a required braking torque from a driver is realized by cooperatively actuating a regenerative braking torque resulting from regenerative control and a friction braking torque resulting from friction brake in a fuel cell vehicle, a technology for further stabilizing a braking torque resulting from cooperative actuation is desired.

The disclosure can be implemented as the following aspect.

An aspect of the disclosure provides a fuel cell vehicle. The fuel cell vehicle includes a drive motor, a fuel cell, a compressor, a friction brake, an electrical storage device, a stagnant water estimating unit, a scavenging processing unit, and a braking control unit. The drive motor is configured to generate a regenerated electric power resulting from regenerative operation and is configured to drive the fuel cell vehicle. The fuel cell includes a cathode and an anode. The fuel cell is configured to supply an electric power to the drive motor. The compressor is configured to feed oxidant gas to the cathode. The friction brake is configured to brake the fuel cell vehicle. The electrical storage device is configured to supply an electric power to the drive motor and is configured to store a dump electric power of the fuel cell vehicle. The stagnant water estimating unit is configured to estimate an amount of stagnant water stagnating in the fuel cell. The scavenging processing unit is configured to, when the estimated amount of stagnant water is greater than or equal to a predetermined first water amount, execute a scavenging process for draining the stagnant water to an outside of the fuel cell by supplying the oxidant gas to the cathode with the compressor. The braking control unit is configured to control the friction brake and the regenerative operation of the drive motor such that a braking request to the fuel cell vehicle is satisfied by using the friction brake and regenerative brake resulting from the regenerative operation. The braking control unit is configured to, in a period during which the fuel cell vehicle is being braked in response to the braking request, (i) when the estimated amount of stagnant water is less than a predetermined second water amount less than the first water amount, limit an upper limit electric power of the regenerated electric power resulting from the regenerative operation to a predetermined first value or below, and (ii) when the estimated amount of stagnant water is greater than or equal to the second water amount, execute an upper limit changing process of setting the upper limit electric power to a second value lower by a predetermined value than the first value. With this aspect, by setting the upper limit electric power to an electric power lower by the predetermined value at a stage before the fuel cell generates an electric power through the scavenging process, a reduction in regenerated electric power resulting from power generation of the fuel cell through the scavenging process can be suppressed. Thus, a braking torque can be further stabilized.

In the above aspect, the upper limit changing process may include a regeneration reduction process of, when the regenerated electric power needs to be reduced by setting the upper limit electric power to the second value, reducing the regenerated electric power to the second value by controlling the regenerative operation such that a predetermined condition is satisfied, the predetermined condition may be a condition that a rate of change in regenerative braking torque that is a braking torque resulting from the regenerative operation is lower than or equal to a rate of change in friction braking torque that is a braking torque resulting from the friction brake, and the braking control unit may be configured to execute a friction increasing process for increasing the frictional braking torque in response to an amount of reduction in the regenerative braking torque caused by the regeneration reduction process. With this aspect, when a regenerated electric power needs to be reduced to the second value by setting the upper limit electric power to an electric power lower by the predetermined value, the amount of change in regenerative braking torque can be compensated by a friction braking torque. Thus, a braking torque can be further brought close to a required braking torque.

In the above aspect, the predetermined value may be set to a value greater than or equal to an estimated amount of increase in the dump electric power due to an increase in electric power generated by the fuel cell when the scavenging process is executed in the period during which the fuel cell vehicle is being braked. With this aspect, a braking torque can be further stabilized.

In the above aspect, an amount of increase in the friction braking torque in the friction increasing process may be set to the same value as the amount of reduction in the regenerative braking torque caused by the regeneration reduction process. With this aspect, an amount of reduction in regenerative braking torque can be compensated by a friction braking torque, so a braking torque can be further brought close to a required braking torque.

In the above aspect, the braking control unit may be configured to, when, after a start of the upper limit changing process, the estimated amount of stagnant water becomes lower than or equal to a predetermined third water amount less than the second water amount and the braking request is cancelled, end the upper limit changing process. With this aspect, by ending the upper limit changing process when the braking request is cancelled, a braking torque can be further stabilized without executing control for coordinating a rate of change in regenerative braking torque with a rate of change in friction braking torque.

The disclosure may be implemented in various modes, and may be implemented by, other than the above-described fuel cell vehicle, for example, a control method for a fuel cell vehicle, a computer program for implementing the control method, or a non-transitory recording medium on which the computer program is recorded.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. Embodiment

Figure 1:
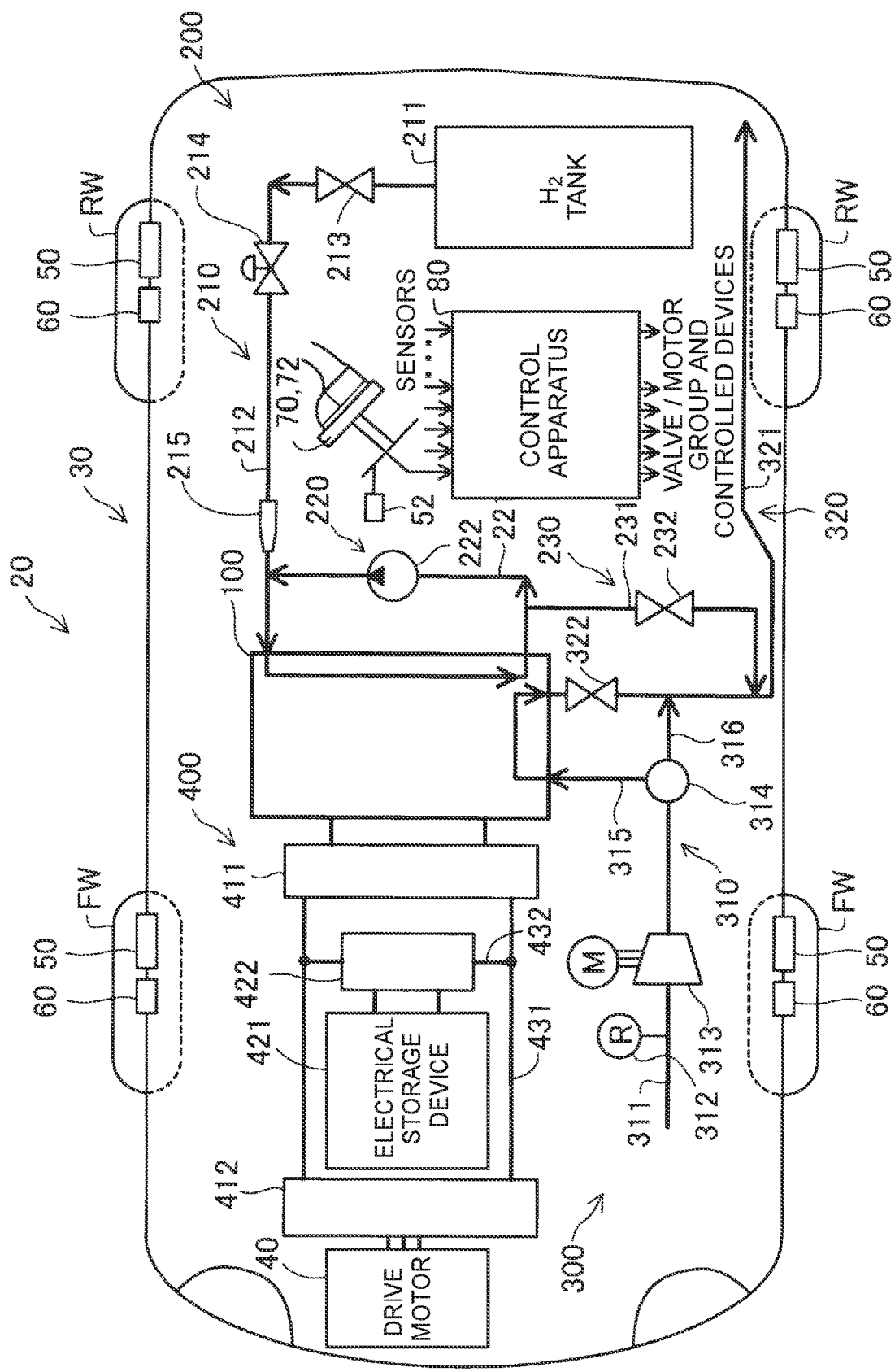
FIG. 1 is a diagram that illustrates the schematic configuration of a fuel cell vehicle in an embodiment.

FIG. 1 is a diagram that illustrates the schematic configuration of a fuel cell vehicle 20 in an embodiment. The fuel cell vehicle 20 includes a fuel cell system 30, a drive motor 40, a friction brake 50, an accelerator pedal 70, a brake pedal 72, a vehicle speed detector 60, front wheels FW, and rear wheels RW. The fuel cell system 30 includes a fuel cell 100, an electrical storage device 421, and a control apparatus 80.

The fuel cell vehicle 20 is driven or braked in response to an operation of the accelerator pedal 70 or the brake pedal 72. The drive motor 40 of the present embodiment is able to generate a regenerated electric power. The drive motor 40 also drives the fuel cell vehicle 20. In other words, the drive motor 40 is able to operate in power running mode to drive the fuel cell vehicle 20 or operate in regeneration mode to brake the fuel cell vehicle 20. The drive motor 40 in the power running mode drives the fuel cell vehicle 20 by rotating at least one of pairs of the front wheels FW and the rear wheels RW upon reception of electric power supplied from the fuel cell system 30. The drive motor 40 in the regeneration mode brakes the fuel cell vehicle 20 by converting the kinetic energy of the fuel cell vehicle 20 to electric power. Braking that is made by the drive motor 40 in the regeneration mode is also called regenerative brake. The fuel cell vehicle 20 of the present embodiment is braked by regenerative cooperative brake using both the regenerative brake and the friction brake 50 in combination. A braking torque generated by the friction brake 50 is also called friction braking torque. A braking torque generated by the regenerative brake is also called regenerative braking torque. A braking torque generated by the regenerative cooperative brake is also called regenerative cooperative braking torque.

The fuel cell system 30 of the present embodiment includes a hydrogen supply and exhaust system 200, an air supply and exhaust system 300, and a power supply system 400 in addition to the fuel cell 100. The fuel cell 100 of the present embodiment is a polymer electrolyte fuel cell. The fuel cell 100 generates an electromotive force by electrochemical reaction. The fuel cell 100 includes an anode and a cathode. As for reaction gases for the fuel cell 100, hydrogen gas is used as a fuel gas, and air is used as an oxidant gas. The fuel cell 100 has a stack structure in which a plurality of single cells is stacked on top of each other. The single cells are connected in series with each other. Each single cell includes a membrane electrode assembly and a pair of separators. In the membrane electrode assembly, an electrode catalyst layer is formed on each of both surfaces of an electrolyte. The separators sandwich the membrane electrode assembly. An anode passage through which hydrogen gas can flow is formed between the separator and the membrane electrode assembly on the anode side. A cathode passage through which air can flow is formed between the separator and the membrane electrode assembly on the cathode side. The fuel cell 100 is able to supply an electric power to the drive motor 40.

The hydrogen supply and exhaust system 200 includes a hydrogen supply unit 210, a hydrogen circulation unit 220, and a hydrogen exhaust unit 230. The hydrogen supply unit 210 includes a hydrogen tank 211, a hydrogen supply passage 212, a main stop valve 213, a pressure reducing valve 214, and an injector 215. The hydrogen tank 211 stores hydrogen gas in a high-pressure state to supply hydrogen gas to the fuel cell 100. The hydrogen supply passage 212 is a passage that connects the hydrogen tank 211 and the anode passages of the fuel cell 100. The main stop valve 213 and the pressure reducing valve 214 are provided in the hydrogen supply passage 212 in order from the upstream side. When the main stop valve 213 is open, high-pressure hydrogen gas stored in the hydrogen tank 211 flows to the hydrogen supply passage 212. The high-pressure hydrogen gas is decompressed by the pressure reducing valve 214 to a predetermined pressure, and is then supplied from the injector 215 to the fuel cell 100 in response to a power generation request from the fuel cell 100.

The hydrogen circulation unit 220 includes a hydrogen circulation passage 221 and a hydrogen circulation pump 222. The hydrogen circulation passage 221 is a passage that connects the anode passages of the fuel cell 100 and the hydrogen supply passage 212 at a portion downstream of the injector 215. The hydrogen circulation pump 222 is provided in the hydrogen circulation passage 221. Unconsumed hydrogen gas contained in anode off-gas emitted from the fuel cell 100 is circulated through the hydrogen supply passage 212 by the hydrogen circulation pump 222. Anode off-gas not only contains unconsumed hydrogen gas but also contains produced water and nitrogen gas resulting from power generation of the fuel cell 100. For this reason, unconsumed hydrogen gas is separated from produced water and nitrogen gas by a gas-liquid separator (not shown)

provided between the fuel cell 100 and the hydrogen circulation pump 222 in the hydrogen circulation passage 221.

The hydrogen exhaust unit 230 includes a hydrogen exhaust passage 231 and an exhaust drain valve 232. The hydrogen exhaust passage 231 is a passage that connects an air exhaust passage 321 (described later) and a portion between the fuel cell 100 and the hydrogen circulation pump 222 in the hydrogen circulation passage 221. The exhaust drain valve 232 is provided in the hydrogen exhaust passage 231. When the exhaust drain valve 232 is open, anode off-gas is emitted to the atmosphere via the air exhaust passage 321.

The air supply and exhaust system 300 includes an air supply unit 310 and an air exhaust unit 320. The air supply unit 310 includes an air introduction passage 311, an air flow meter 312, a compressor 313, a flow dividing valve 314, an air supply passage 315, and an air bypass passage 316. The air introduction passage 311 is a passage that communicates with the atmosphere and is connected by the flow dividing valve 314 to the air supply passage 315 and the air bypass passage 316. The air flow meter 312, the compressor 313, and the flow dividing valve 314 are provided in the air introduction passage 311 in order from the upstream side. The air flow meter 312 is a sensor that detects the flow rate of air introduced to the air introduction passage 311. The compressor 313 is a compressor for introducing air into the air introduction passage 311 and feeding the introduced air to the fuel cell 100. The compressor 313 of the present embodiment is a turbocompressor. The compressor 313 is not limited to a turbocompressor and may be a positive-displacement compressor. The flow dividing valve 314 is able to adjust the flow rate of air flowing to the air supply passage 315 and the flow rate of air flowing to the air bypass passage 316. The air supply passage 315 is a passage that connects the flow dividing valve 314 and the cathode passages of the fuel cell 100. The air bypass passage 316 is a passage that connects the flow dividing valve 314 and the air exhaust passage 321 (described later). The air bypass passage 316 may communicate with the atmosphere without being connected to the air exhaust passage 321.

The air exhaust unit 320 includes the air exhaust passage 321 and a pressure regulating valve 322. The air exhaust passage 321 is a passage that communicates with the atmosphere and that is connected to the cathode passages of the fuel cell 100. The pressure regulating valve 322 is provided in the air exhaust passage 321. When the opening degree of the pressure regulating valve 322 is adjusted, the pressure of air in the cathode passages of the fuel cell 100 or the flow rate of air that is discharged from the compressor 313 is adjusted. The air bypass passage 316 and the hydrogen exhaust passage 231 are connected to the air exhaust passage 321 at a portion downstream of the pressure regulating valve 322 in order from the upstream side. Cathode off-gas emitted from the cathode of the fuel cell 100 flows through the air exhaust passage 321 together with air flowing from the air bypass passage 316 or anode off-gas flowing from the hydrogen exhaust passage 231, and is emitted to the atmosphere.

The fuel cell system 30 further includes a refrigerant circulation system (not shown) for adjusting the temperature of the fuel cell 100. The refrigerant circulation system is configured such that refrigerant having cooled the fuel cell 100 circulates in the fuel cell 100 via a radiator that causes refrigerant to radiate heat.

The power supply system 400 includes a step-up converter 411, an inverter 412, an electrical storage device 421, a step-up/step-down converter 422, a first wire 431, and a second wire 432. The fuel cell 100, the step-up converter 411, and the inverter 412 are electrically connected in this order by the first wire 431. The electrical storage device 421, the step-up/step-down converter 422, and a portion in the first wire 431 between the step-up converter 411 and the inverter 412 are electrically connected by the second wire 432 in this order. A direct-current power generated by the fuel cell 100 is stepped up by the step-up converter 411, then converted to three-phase alternating-current power by the inverter 412, and supplied to the drive motor 40. A direct-current power stored in the electrical storage device 421 is stepped up by the step-up/step-down converter 422, then converted to three-phase alternating-current power by the inverter 412, and supplied to the drive motor 40. The step-up/step-down converter 422 is not only configured to be able to step up an electric power stored in the electrical storage device 421 but also configured to be able to step down an electric power generated by the fuel cell 100 or an electric power generated by the drive motor 40 in regeneration mode. The inverter 412 is configured to not only able to convert a direct-current power to an alternating-current power but also configured to be able to convert an alternating-current power to a direct-current power.

The electrical storage device 421 is able to store a generated electric power generated by the fuel cell 100 and a regenerated electric power generated through regenerative operation of the drive motor 40 in regeneration mode. When the sum of a generated electric power and a regenerated electric power exceeds an electric power that is consumed by auxiliaries, and the like, of the fuel cell system 30, including the compressor 313 and the hydrogen circulation pump 222, an electric power in surplus amount is stored in the electrical storage device 421. The electrical storage device 421 stores an electric power within the range of the state of charge lower than or equal to a predetermined upper limit value. An electric power stored in the electrical storage device 421 can be supplied to the drive motor 40 or the auxiliaries of the fuel cell system 30. Examples of the electrical storage device 421 include a lithium ion battery and a nickel-metal hydride battery. The electrical storage device 421 may be a capacitor instead of a secondary battery.

The friction brake 50 is a decelerating device for braking the fuel cell vehicle 20 by converting the kinetic energy of the fuel cell vehicle 20 to thermal energy generated by friction. The friction brake 50 of the present embodiment is a hydraulic disc brake that is actuated by an actuator. The fuel cell vehicle 20 includes a liquid pressure sensor 52 that detects a brake fluid pressure that is a master cylinder pressure of the friction brake 50. Alternatively, the friction brake 50 may be a drum brake that is actuated by an actuator.

The vehicle speed detector 60 detects the vehicle speed of the fuel cell vehicle 20. The vehicle speed detector 60 of the present embodiment detects a vehicle speed by using rotation speeds of the wheels of the fuel cell vehicle 20, obtained by wheel speed sensors. Alternatively, the vehicle speed detector 60 may detect a vehicle speed by using an acceleration of the fuel cell vehicle 20, obtained by an acceleration sensor, or may detect a vehicle speed by using positional information obtained by the global navigation satellite system (GNSS).

The control apparatus 80 controls the operation of the fuel cell vehicle 20. The control apparatus 80, for example, controls the flow rate of oxidant gas supplied to the cathode by controlling the operation of the compressor 313.

Figure 2:
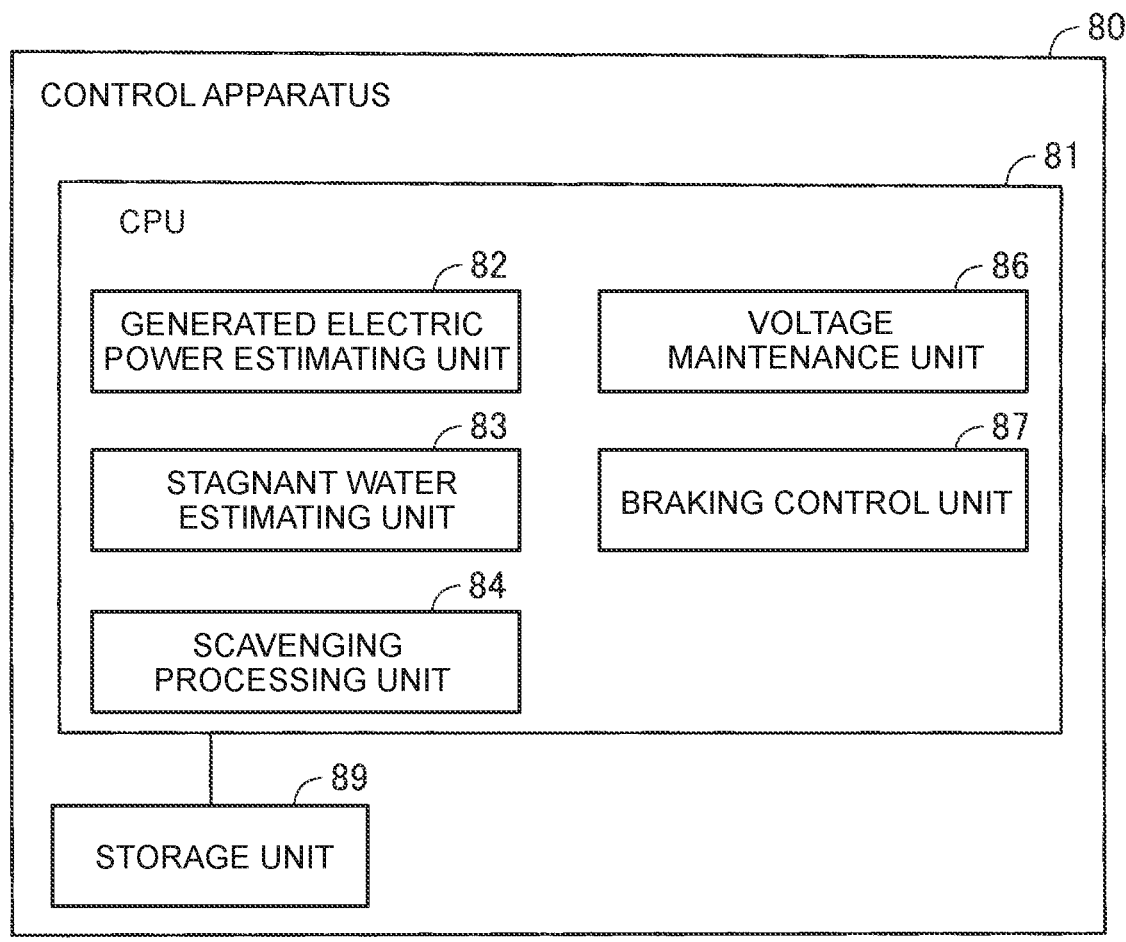
FIG. 2 is a functional block diagram of a control apparatus.

FIG. 2 is a functional block diagram of the control apparatus 80. The control apparatus 80 is configured as a computer including a CPU 81, a storage unit 89, and an interface circuit to which components are connected. The storage unit 89 is made up of a ROM, a RAM, and the like, and stores various programs for controlling the fuel cell vehicle 20, and various data. The CPU 81 functions as a generated electric power estimating unit 82, a stagnant water estimating unit 83, a scavenging processing unit 84, a voltage maintenance unit 86, and a braking control unit 87 by running the various programs stored in the storage unit 89.

The generated electric power estimating unit 82 estimates a generated electric power [kW] of the fuel cell 100 for the flow rate of oxidant gas supplied to the cathode of the fuel cell 100. The generated electric power estimating unit 82, for example, estimates a generated electric power by using a map that represents the relationship between a flow rate of oxidant gas supplied and a generated electric power and that is stored in the storage unit 89. In another embodiment, the generated electric power estimating unit 82 may estimate a generated electric power of the fuel cell 100 by using a voltage sensor (not shown) that detects a voltage of the fuel cell 100 and a current sensor (not shown) that detects a current of the fuel cell 100.

The stagnant water estimating unit 83 estimates the amount of stagnant water stagnating in the fuel cell 100. Specifically, the stagnant water estimating unit 83 estimates the amount of stagnant water by estimating the amount of increase in stagnant water per unit time and adding the estimated amount of increase in stagnant water per unit time to an initial value. The initial value is set to, for example, zero. The stagnant water estimating unit 83 also returns the amount of stagnant water to the initial value (zero in the present embodiment) at the time when a scavenging process (described later) is complete. In the present embodiment, during execution of the scavenging process, the amount of stagnant water is regarded as the estimated amount of stagnant water just before the scavenging process.

The stagnant water estimating unit 83 estimates a difference between the amount of water produced as a result of power generation of the fuel cell 100 per unit time and the amount of moisture emitted together with cathode off-gas from the fuel cell 100 per unit time as the amount of increase in stagnant water per unit time. The amount of water produced as a result of power generation of the fuel cell 100 per unit time can be calculated by using a current that is output from the fuel cell 100, the molecular weight of water, and the like. The amount of moisture emitted together with cathode off-gas from the fuel cell 100 per unit time can be calculated by using the amount of saturated vapor at the temperature in the fuel cell 100, the flow rate of air that is supplied into the fuel cell 100, and the like. A current that is output from the fuel cell 100 can be measured by using a current sensor. The temperature of refrigerant near a refrigerant outlet of the fuel cell 100 can be used as the temperature in the fuel cell 100. The temperature of refrigerant near the refrigerant outlet of the fuel cell 100 can be measured by using a temperature sensor.

The scavenging processing unit 84 executes the scavenging process when the amount of stagnant water estimated by the stagnant water estimating unit 83 (estimated stagnant water) is greater than or equal to a predetermined first water amount. The first water amount is, for example, set to the amount of stagnant water in the fuel cell 100 in the case where 0.2 g stagnant water is present in each single cell. In other words, the first water amount is the product of 0.2 g/cell and the number of cell stacks of the fuel cell 100. The scavenging process is a process of, regardless of a required electric power from the fuel cell vehicle 20, draining stagnant water in the fuel cell 100 to the outside of the fuel cell 100 by supplying oxidant gas at a predetermined target flow rate to the cathode for a predetermined period of time with the use of the compressor 313. During execution of the scavenging process, anode gas in a predetermined flow rate is supplied to the anode of the fuel cell 100.

When the voltage of the fuel cell 100 has reached a predetermined upper limit voltage, the voltage maintenance unit 86 maintains the voltage of the fuel cell 100 to the upper limit voltage or below by causing the fuel cell 100 to generate an electric power by adjusting a current to be reduced from the fuel cell 100. Specifically, when a detected value of the voltage sensor (not shown) of the fuel cell 100 has reached an upper limit voltage, the voltage maintenance unit 86 maintains the voltage to the upper limit voltage or below by causing the fuel cell 100 to generate an electric power as a result of reducing a current from the fuel cell 100 by controlling the step-up converter 411. For example, when the scavenging process is executed, the voltage of the fuel cell 100 increases, so the fuel cell 100 is caused to generate an electric power while a current is reduced from the fuel cell 100. By maintaining the voltage of the fuel cell 100 to a value lower than or equal to the predetermined upper limit voltage or below, degradation of the fuel cell 100 can be suppressed. Degradation of the fuel cell 100 can occur as a result of leaching of a catalyst, such as platinum, included in the fuel cell 100.

The braking control unit 87 controls the friction brake 50 and the regeneration operation by using the friction brake 50 and the regenerative brake such that a braking request to the fuel cell vehicle 20 is satisfied. Specifically, the braking control unit 87 controls the ratio between the friction braking torque and the regenerative braking torque. The braking control unit 87 controls the friction braking torque by controlling a brake fluid pressure. The braking control unit 87 also controls the regenerative braking torque by controlling a current value and a current advance in the drive motor 40. The relationship between a regenerative braking torque and both a current value and a current advance is stored in the storage unit 89 as a map.

The braking control unit 87 executes the following process in a period during which the fuel cell vehicle 20 is being braked in response to a braking request. In other words, when the estimated amount of stagnant water is less than a predetermined second water amount less than the first water amount, the braking control unit 87 limits the upper limit electric power of a regenerated electric power generated by the regenerative operation to a value less than or equal to a predetermined first value. When the estimated amount of stagnant water is greater than or equal to the second water amount, the braking control unit 87 executes an upper limit changing process of setting the upper limit electric power to a second value lower by a predetermined value than the first value. The second water amount is set to the amount of stagnant water in the fuel cell 100, for example, in the case where stagnant water in the range of greater than or equal to 0.15 g and less than or equal to 0.19 g is present in each single cell. In the present embodiment, stagnant water per single cell is set to 0.15 g. In other words, the second water amount is the product of 0.15 g/cell and the number of cell stacks of the fuel cell 100. The predetermined value is set to a value greater than or equal to an estimated amount of increase in dump electric power due to an increase in generated electric power of the fuel cell 100 when the scavenging process is executed in the period during which the fuel cell vehicle 20 is being braked. The value greater than or equal to an estimated amount of increase in dump electric power may be, for example, a value of an estimated amount of increase or an estimated scavenging generated electric power that is generated by the fuel cell 100 through the scavenging process and estimated by the generated electric power estimating unit 82. The braking control unit 87 may estimate an estimated amount of increase by using a generated electric power estimated by the generated electric power estimating unit 82 and an electric power that is consumed by the auxiliaries, and the like, of the fuel cell 100. Alternatively, the braking control unit 87 may set a predetermined constant value as an estimated amount of increase. By setting the upper limit electric power to a value lower by an estimated amount of increase or more at the time before the scavenging process is started, the electrical storage device 421 can be charged with a generated electric power of the fuel cell 100 through the scavenging process. Thus, a reduction in regenerated electric power resulting from power generation of the fuel cell 100 through the scavenging process can be suppressed, so a braking torque can be further stabilized.

The upper limit changing process includes a regeneration reduction process of, when an actual regenerated electric power needs to be reduced as a result of the upper limit electric power set to the second value, reducing a regenerated electric power to the second value by controlling the regenerative operation such that a predetermined condition is satisfied. The predetermined condition is a condition that a rate of change in regenerative braking torque is lower than or equal to a rate of change in friction braking torque. The rate of change in friction braking torque, for example, may be changed according to a brake fluid pressure of the friction brake 50 or set to a predetermined constant rate. Through the regeneration reduction process, the regenerative braking torque can be changed in coordination with the response of the friction braking torque, so the amount of change in regenerative braking torque can be compensated by the friction braking torque. Thus, a braking torque can be further brought close to a required braking torque.

The braking control unit 87 executes a friction increasing process of increasing the friction braking torque in response to an amount of reduction in regenerative braking torque resulting from the regeneration reduction process. The friction increasing process is a process of compensating an amount of reduction in regenerative braking torque with the friction braking torque such that the braking torque does not significantly deviate from the required braking torque. In the present embodiment, the amount of increase in friction braking torque in the friction increasing process is set to the same value as the amount of reduction in regenerative braking torque resulting from the regeneration reduction process. Thus, the amount of reduction in regenerative braking torque can be compensated with the friction braking torque, so the braking torque can be further brought close to the required braking torque.

Figure 3:
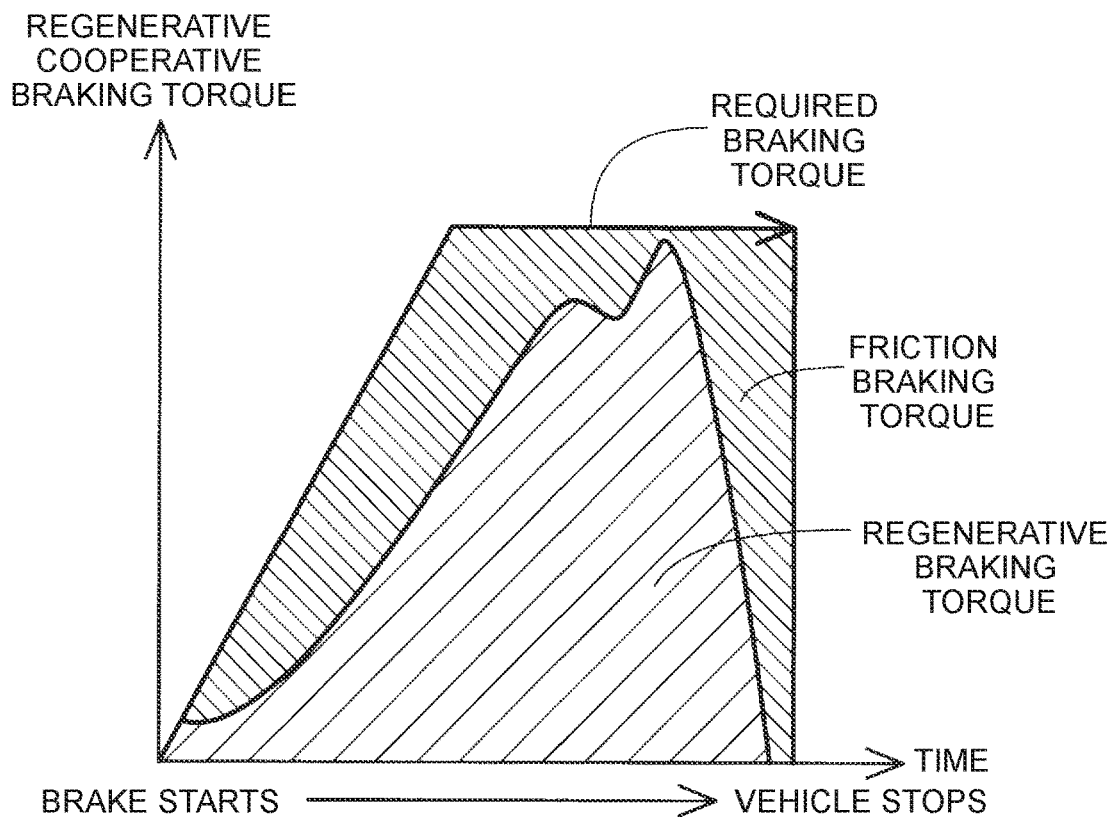
FIG. 3 is a graph for schematically illustrating a change in braking torque during regenerative cooperative braking.

FIG. 3 is a graph for schematically illustrating a change in braking torque during regenerative cooperative braking. The abscissa axis represents a period of time from the start of braking using the regenerative cooperative brake to a stop of the fuel cell vehicle 20. The ordinate axis represents a regenerative cooperative braking torque. Generally, in a low-speed range in which a torque from drive wheels for the drive motor 40 to generate a regenerated electric power is not sufficiently obtained, a regenerative braking torque decreases. For this reason, the control apparatus 80 of the present embodiment reduces the rate of regenerative braking torque with a decrease in the speed of the fuel cell vehicle 20 in order to ensure a stable regenerative cooperative braking torque.

Figure 4:
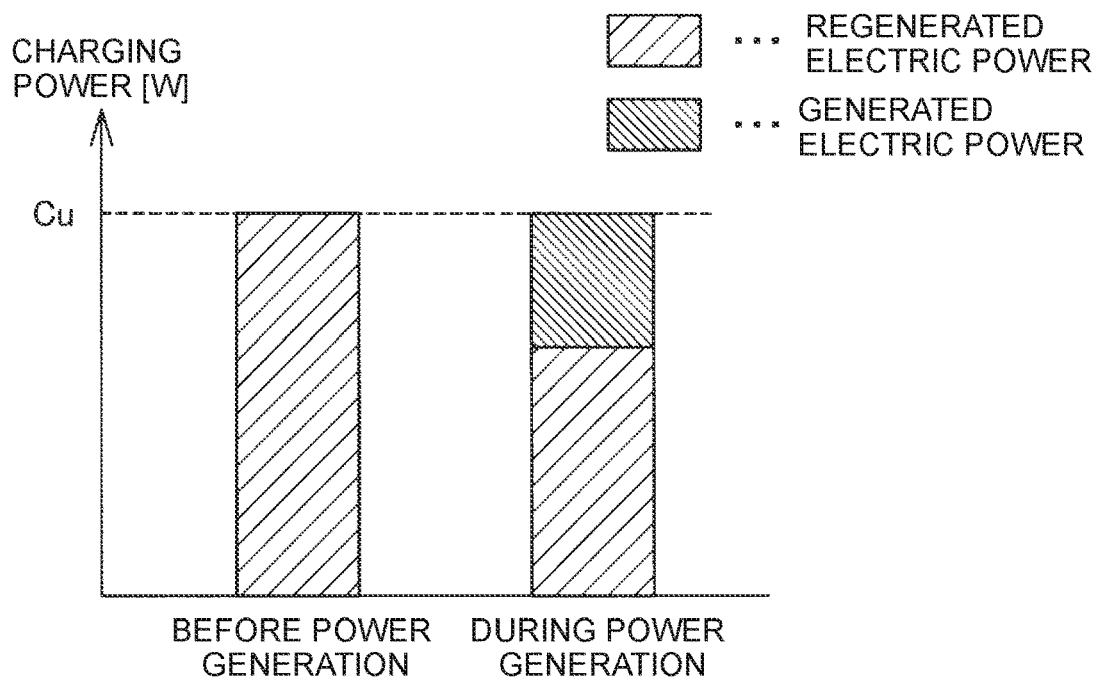
FIG. 4 is a graph for illustrating a charging power for an electrical storage device.

FIG. 4 is a graph for illustrating a charging power for the electrical storage device 421. The electrical storage device 421 is controlled by the control apparatus 80 so as to be able to store an electric power within the range lower than or equal to a predetermined upper limit value Cu. When power generation of the fuel cell 100 is stopped in a cooperative braking period during which regenerative cooperative brake is being performed, a greater amount of regenerated electric power can be stored in the electrical storage device 421. On the other hand, when the scavenging process is executed and the fuel cell 100 is caused to generate an electric power in order to maintain the voltage to an upper limit voltage or below in the cooperative braking period, a dump generated electric power that is not used for the operation of the fuel cell vehicle 20 can occur. For this reason, in order for the electrical storage device 421 to store a dump generated electric power, a storable regenerated electric power reduces.

Figure 5:
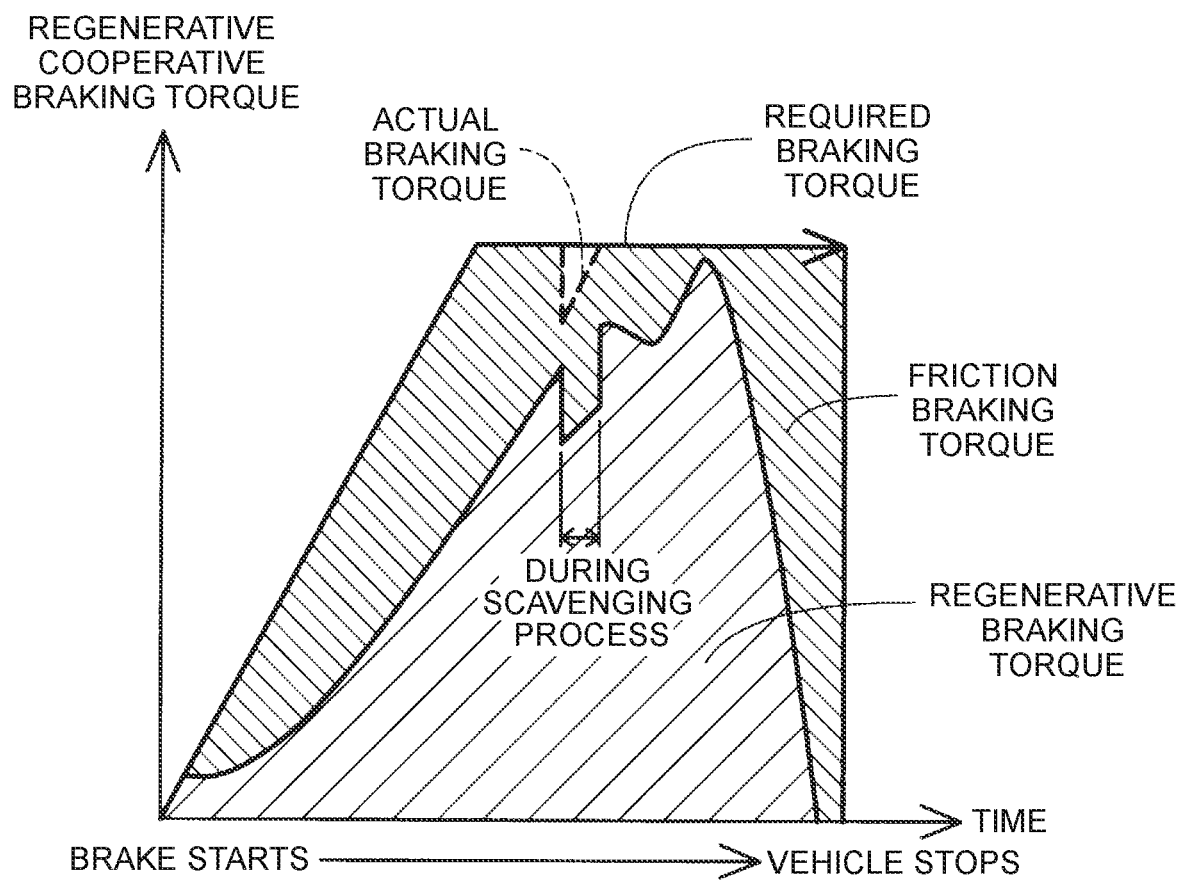
FIG. 5 is a reference graph that schematically illustrates a change in braking torque during regenerative cooperative braking.

FIG. 5 is a reference graph that schematically shows a change in braking torque during regenerative cooperative braking. FIG. 5 shows a change in regenerative cooperative braking torque in the case where the scavenging process is executed in a state where a regenerative braking torque has been generated. As the scavenging process is executed, the state of charge from a regenerated electric power in the electrical storage device 421 reduces in order to store a dump electric power in generated electric power generated by the scavenging process (FIG. 4). Thus, when the charging power for the electrical storage device 421 has reached the upper limit value Cu, a destination where a regenerated electric power is stored or consumed disappears and, as a result, no current flows from the drive motor 40. For this reason, in the fuel cell system 30, with an increase in generated electric power of the fuel cell 100, magnetic force for the drive motor 40 to brake the rotation of the drive wheels decreases, with the result that a regenerative braking torque decreases. When the regenerative braking torque has decreased, the friction brake 50 is controlled to increase the friction braking torque to compensate for the required braking torque.

In a period during which the fuel cell vehicle 20 is being braked by the regenerative cooperative brake, before the scavenging process is executed, the braking control unit 87 of the present embodiment executes an upper limit changing process of setting the upper limit electric power of a regenerated electric power, generated through the regenerative operation, to a value lower by a predetermined value such that the generated electric power of the fuel cell 100 resulting from the scavenging process can be stored. A specific example of a process, including the upper limit changing process, that the fuel cell system 30 executed will be described below.

Figure 6:
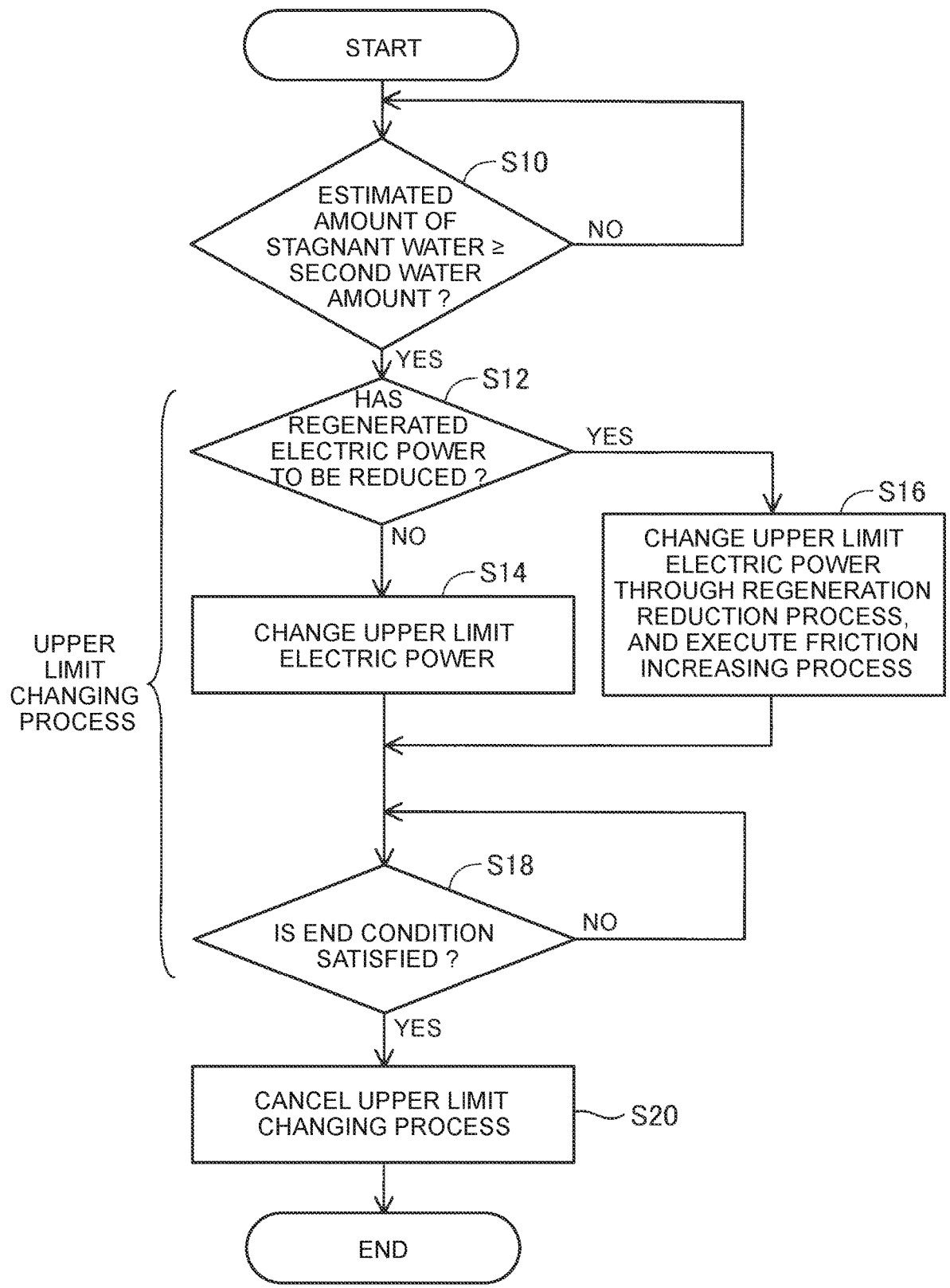
FIG. 6 is a flowchart including an upper limit changing process that the control apparatus executes during a braking period.
Figure 7:
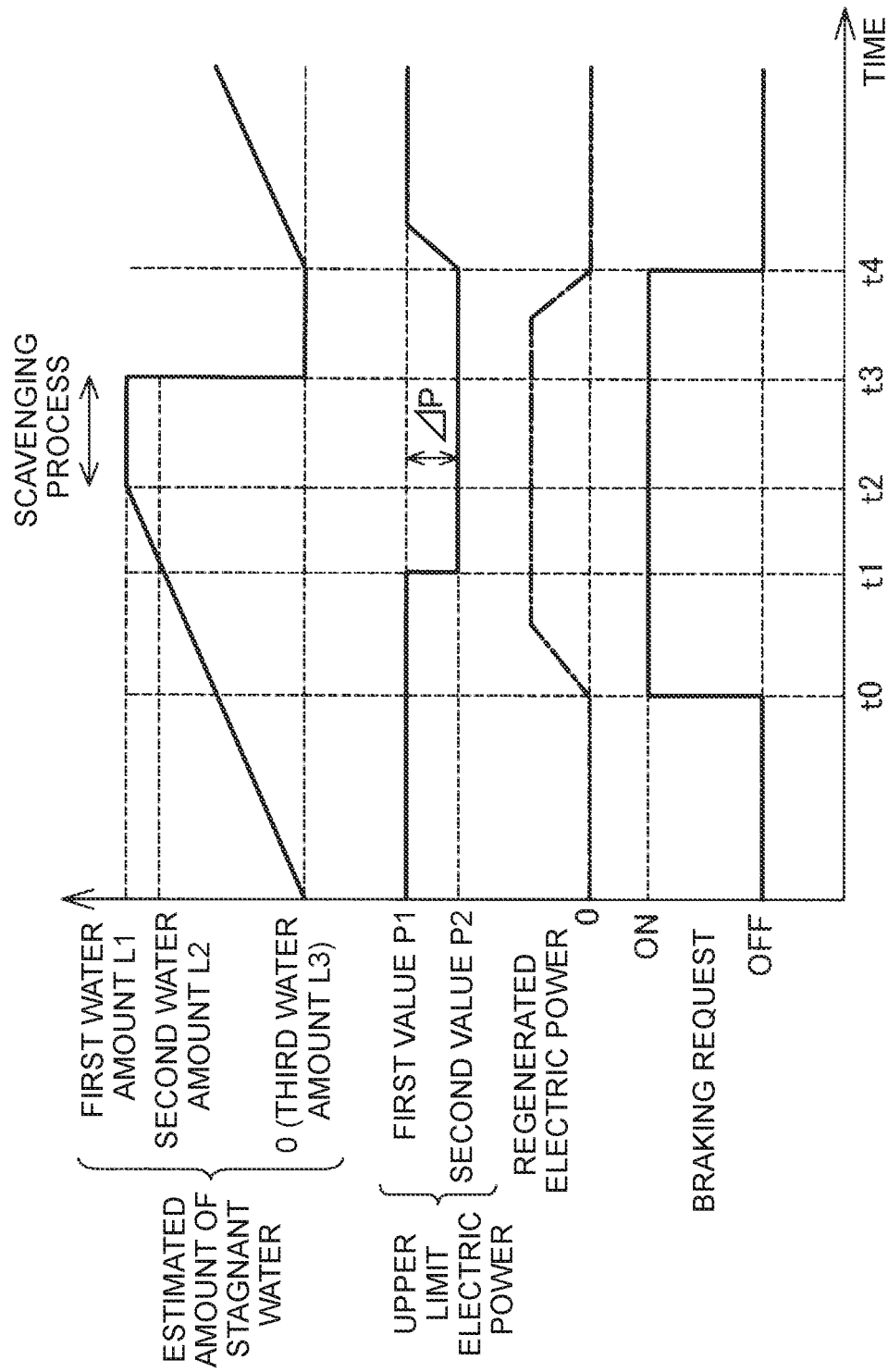
FIG. 7 is a first timing chart for scavenging process, upper limit changing process, regenerated electric power, and braking request.
Figure 8:
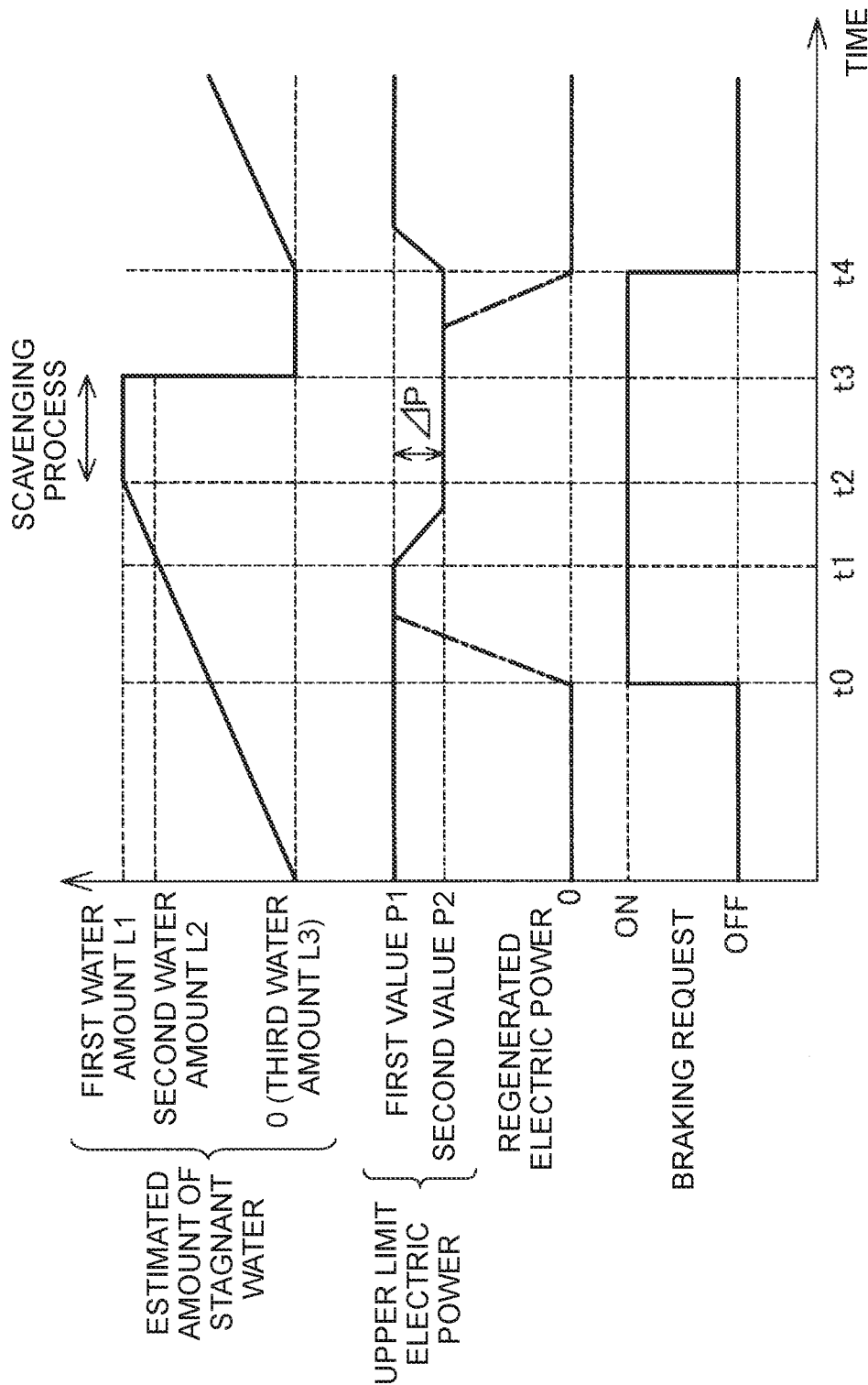
FIG. 8 is a second timing chart for scavenging process, upper limit changing process, regenerated electric power, and braking request.

FIG. 6 is a flowchart including the upper limit changing process that the control apparatus 80 executes during a braking period. FIG. 7 is a first timing chart for scavenging process, upper limit changing process, regenerated electric power, and braking request. FIG. 8 is a second timing chart for scavenging process, upper limit changing process, regenerated electric power, and braking request. The flowchart shown in FIG. 6 is started on the condition that a braking request has occurred as a result of depression of the brake pedal 72. In other words, as shown in FIG. 7 and FIG. 8, the flowchart of FIG. 6 is started when a braking request becomes an on state at time t0. FIG. 7 is a timing chart when the processes of step S12 and step S14 are executed. FIG. 8 is a timing chart when the processes of step S12 and step S16 are executed. In FIG. 7 and FIG. 8, a first water amount L1 is a threshold for executing the scavenging process. A second water amount L2 is a threshold for executing the upper limit changing process. A third water amount L3 is set to a value less than the second water amount and is zero in the present embodiment. An upper limit electric power is an upper limit of an electric power that is stored in the electrical storage device 421. A first value P1 is a value of the upper limit electric power before the upper limit changing process. A second value P2 is a value of the upper limit electric power when the upper limit changing process is being executed.

As shown in FIG. 6, the stagnant water estimating unit 83 determines whether the estimated amount of stagnant water is greater than or equal to the second water amount L2 (step S10). When the estimated amount of stagnant water is less than the second water amount L2, the stagnant water estimating unit 83 repeatedly executes step S10.

On the other hand, when the estimated amount of stagnant water is greater than or equal to the second water amount L2, the braking control unit 87 executes the upper limit changing process (step S12, step S14, step S16, step S18). First, when the upper limit electric power is set to the second value P2 lower by a predetermined value ΔP than the first value P1, the braking control unit 87 determines whether the regenerated electric power at present time needs to be reduced (step S12). In other words, the braking control unit 87 determines whether the regenerated electric power being generated through regenerative control at present time is higher than the second value P2 set so as to be lower by the predetermined value ΔP. When the regenerated electric power needs to be reduced (Yes in step S12), the regeneration reduction process and the friction increasing process are executed (step S16). In the regeneration reduction process, the braking control unit 87 changes the upper limit electric power by gradually reducing the regenerated electric power to the second value P2. In other words, when the upper limit electric power is reduced to be changed by the predetermined value ΔP from the first value P1 to the second value P2, the regenerated electric power is reduced by reducing the regenerative braking torque such that the rate of reduction in regenerative braking torque is lower than or equal to the rate of change in friction braking torque. In the example shown in FIG. 8, the regenerated electric power is the first value P1 that is the upper limit electric power at time t1 at which the upper limit changing process is started, and, in this case, the regenerated electric power is gradually reduced with a reduction in the upper limit electric power. In the friction increasing process, the friction brake 50 is controlled such that the friction braking torque increases by the same value as the amount of reduction in regenerative braking torque resulting from the regeneration reduction process. Through the regeneration reduction process and the friction increasing process, the amount of reduction in regenerative braking torque can be compensated with the friction braking torque, so the braking torque can be further brought close to the required braking torque.

When the regenerated electric power does not need to be reduced (No in step S12), the upper limit electric power is changed by reducing the upper limit electric power by the predetermined value ΔP to the second value P2 (step S14). In step S14, the rate of change in upper limit electric power may be a selected value. In the present embodiment, as shown in FIG. 7, at time t1 at which the upper limit changing process is started, the upper limit electric power is reduced by the value P to the second value.

As shown in FIG. 6, after the upper limit changing process is started, the braking control unit 87 determines whether an end condition is satisfied (step S18). The end condition is a condition that the estimated stagnant water is less than or equal to the third water amount L3 less than the second water amount L2 and a braking request to the fuel cell vehicle 20 is cancelled. The third water amount L3 is set to an initial value that is an estimated amount of stagnant water at the time when the scavenging process completes and is set to zero in the present embodiment. A braking request from a driver is cancelled when the depression amount of the brake pedal 72 becomes zero.

When the end condition is not satisfied, step S18 is repeatedly executed. On the other hand, when the end condition is satisfied, the braking control unit 87 ends the upper limit changing process by changing the upper limit electric power to the value before reduction, that is, the first value P1 (step S20). In FIG. 7 and FIG. 8, the upper limit changing process is ended at time t4 at which the end condition is satisfied. In FIG. 7 and FIG. 8, the upper limit changing process is ended at time t4, so the upper limit electric power is gradually changed from the second value P2 to the first value P1.

According to the above-described embodiment, by setting the upper limit electric power to an electric power lower by the predetermined value ΔP at a stage before the fuel cell 100 generates an electric power through the scavenging process, a reduction in regenerated electric power resulting from power generation of the fuel cell 100 through the scavenging process can be suppressed. Thus, a braking torque can be further stabilized, so a decrease in the drivability of the fuel cell vehicle 20 can be minimized.

When the upper limit changing process is ended in the case where an estimated amount of stagnant water becomes less than or equal to the third water amount L3 less than the second water amount L2, a regenerative braking torque can steeply increase depending on the required braking torque. On the other hand, a braking torque may fluctuate because the rate of reduction in friction braking torque is lower than the rate of increase in regenerative braking torque. With this aspect, when an estimated amount of stagnant water is less than or equal to the predetermined third water amount L3 less than the second water amount L2 and a braking request is cancelled, the upper limit changing process is ended (step S20 of FIG. 6). Thus, a regenerative braking torque does not steeply increase after ending of the upper limit changing process, so a braking torque can be further stabilized without executing control for coordinating the rate of change in regenerative braking torque with the rate of change in friction braking torque.

B. Other Embodiments

According to the above-described embodiment, the amount of increase in friction braking torque in the friction increasing process is set to the same value as the amount of reduction in regenerative braking torque resulting from the regeneration reduction process; however, the configuration is not limited thereto. For example, the amount of increase in friction braking torque and the amount of reduction in regenerative braking torque may be set to different values within the range in which a braking torque does not significantly deviate from a required braking torque.

The disclosure is not limited to the above-described embodiments; the disclosure encompasses various modifications. For example, the above-described embodiments are described in detail to illustrate the disclosure easily; however, the disclosure is not necessarily limited to the one including all the described components. Part of the components of one embodiment may be replaced with the components of another one of the alternative embodiments or the components of another one of the alternative embodiments may be added to the components of one embodiment. As for part of the components of each embodiment, addition, deletion, or replacement of other components is possible. A combination of one embodiment, one alternative embodiment, and one modification is applicable.

What is claimed is:

1. A fuel cell vehicle comprising:
a drive motor configured to generate a regenerated electric power through regenerative operation and configured to drive the fuel cell vehicle;
a fuel cell including a cathode and an anode and configured to supply an electric power to the drive motor;
a compressor configured to feed oxidant gas to the cathode;
a friction brake configured to brake the fuel cell vehicle;
an electrical storage device configured to supply an electric power to the drive motor and configured to store a dump electric power of the fuel cell vehicle;
a stagnant water estimating unit configured to estimate an amount of stagnant water stagnating in the fuel cell;
a scavenging processing unit configured to, when the estimated amount of stagnant water is greater than or equal to a predetermined first water amount, execute a scavenging process for draining the stagnant water to an outside of the fuel cell by supplying the oxidant gas to the cathode with the compressor; and
a braking control unit configured to control the friction brake and the regenerative operation of the drive motor such that a braking request to the fuel cell vehicle is satisfied by using the friction brake and regenerative brake resulting from the regenerative operation, wherein the braking control unit is configured to, in a period during which the fuel cell vehicle is being braked in response to the braking request,
(i) when the estimated amount of stagnant water is less than a predetermined second water amount less than the first water amount, limit an upper limit electric power of the regenerated electric power resulting from the regenerative operation to a predetermined first value or below, and
(ii) when the estimated amount of stagnant water is greater than or equal to the second water amount, execute an upper limit changing process of setting the upper limit electric power to a second value lower by a predetermined value than the first value.

2. The fuel cell vehicle according to claim 1, wherein:
the upper limit changing process includes a regeneration reduction process of, when the regenerated electric power needs to be reduced by setting the upper limit electric power to the second value, reducing the regenerated electric power to the second value by controlling the regenerative operation such that a predetermined condition is satisfied;
the predetermined condition is a condition that a rate of change in regenerative braking torque that is a braking torque resulting from the regenerative operation is lower than or equal to a rate of change in friction braking torque that is a braking torque resulting from the friction brake; and
the braking control unit is configured to execute a friction increasing process for increasing the friction braking torque in response to an amount of reduction in the regenerative braking torque caused by the regeneration reduction process.

3. The fuel cell vehicle according to claim 2, wherein the predetermined value is set to a value greater than or equal to an estimated amount of increase in the dump electric power due to an increase in electric power generated by the fuel cell when the scavenging process is executed in the period during which the fuel cell vehicle is being braked.

4. The fuel cell vehicle according to claim 2, wherein an amount of increase in the friction braking torque in the friction increasing process is set to the same value as the amount of reduction in the regenerative braking torque caused by the regeneration reduction process.

5. The fuel cell vehicle according to claim 1, wherein the braking control unit is configured to, when, after a start of the upper limit changing process, the estimated amount of stagnant water becomes lower than or equal to a predetermined third water amount less than the second water amount and the braking request is cancelled, end the upper limit changing process.

* * * * *